United States Patent [19]

Tobias

[11] Patent Number: 4,952,222
[45] Date of Patent: Aug. 28, 1990

[54] GRASS CUTTING DEVICE

[76] Inventor: Richard Tobias, Knapp Rd. R.D. 2, Carmel, N.Y. 10512

[21] Appl. No.: 349,571

[22] Filed: May 9, 1989

[51] Int. Cl.$^5$ .............................................. A01D 34/00
[52] U.S. Cl. ............................................ 56/1; 47/1.3; 56/16.7
[58] Field of Search ................. 56/229, 289, 1; 30/40; 83/171; 47/1.3

[56] References Cited

U.S. PATENT DOCUMENTS

| | | | |
|---|---|---|---|
| 2,750,712 | 6/1956 | Rainey | 47/1.3 |
| 3,559,337 | 2/1971 | Marcoux et al. | 47/1.3 |
| 3,919,806 | 11/1975 | Pluenneke et al. | 47/1.3 |
| 4,338,744 | 7/1982 | Gilmore | 47/1.3 |

Primary Examiner—William P. Neuder
Attorney, Agent, or Firm—Brumbaugh, Graves, Donohue & Raymond

[57] ABSTRACT

A grass cutting device that establishes an electrically activated energy path at a location proximate to the ground. Alternate energy paths are a hot wire, a discharge path between closely spaced electrodes, and a laser. The grass is cut as the device is moved across the lawn causing the electrically activated energy path to intersect the blades of grass searing off the tips of the grass blades where it touches them.

18 Claims, 3 Drawing Sheets

GRASS CUTTING DEVICE

BACKGROUND OF THE INVENTION

The present invention relates generally to an apparatus that is an electrically operated grass cutting device, and more particularly to a bladeless grass cutter that establishes a grass cutting energy path.

Currently, power lawn mowers have a motor driven blade that rotates to cut the grass. Gasoline engine lawn mowers of this kind emit noxious fumes and are excessively loud. All such mowers need periodic sharpening of the blade. Electrical power mowers run the risk of the cord being cut.

Typically, gasoline driven power mowers have needed regular maintenance and replacement of spark plugs, oil changes, air filter changes, not to mention the regular need to replenish gas cans. Power mowers have been relatively heavy. A significant reduction in weight would ease the task of mowing or eliminate the need for self propulsion. Moreover, if sufficient weight reduction could be achieved, a much wider cutting device could be accomplished. The number of moving parts in the typical power mower increases the likelihood of breakdown, and the rotating blade can throw a stone to cause injury. Ordinary mowers have not been readily adapted for specialty cutting such as trimming at walks and the like and they have been unable to follow contours in the lawn.

It would be desirable, therefore, to enable an operator to cut grass without the rotating blade, the noise or the emissions, with a lightweight cutting device that is easily moved over a lawn. The present invention has these advantages.

SUMMARY OF THE INVENTION

There is provided in accordance with the invention an improved apparatus and method for cutting grass in which an energy path is established proximate the ground to cut the grass. Blades of grass intersecting the energy path are severed as the grass cutting device is guided across a lawn.

The grass cutting device includes a frame that serves as a support for the grass cutting provisions and is adapted to rest on or in close proximity to the ground. The frame supports the provisions for establishing the electrically activated energy path. A suitable handle can direct the movement of the device across an area of the lawn.

A preferred embodiment of the invention includes, as the electrically activated energy path, at least one strand of wire which extends proximate the ground. Electrical current is conducted through the wire and heats the wire sufficiently to effect the cutting of the intersecting blades of grass. Multiple strands of wire crossing the path of movement of the device can be used. A circuit interruptor or interlock can be utilized as a safety feature, and is located to sense lifting of the device. If either end of the frame is elevated, an interruptor can cut off all current to the wires, allowing the wires to cool and preventing electrical shocks. Of course, the device can include, a normally open hand activated switch at the handle, to cut off current to the wires when the handle is released. Alternatively, or in addition to any safety interlock, a movement sensor can control current to interrupt the current to the wires whenever the cutting device is stopped. This is to prevent scorching of the grass by an immobile unit.

Because the wires are flexible and the cutting device can be very light, the embodiment that has the energy path established by the current conducting wires can be quite wide and can be equipped with intermediate runners or wheels at locations across the width. These can support the wires at intermediate locations to allow the wires to conform to the contours of the lawn. Also, because of the flexibility of the wires, the invention can be readily adapted to provide devices for specialized cutting, such as trimming with a beveled edge or even cutting along an unusual lawn contour with a specially configured cutting device.

In one modified version, the electric current-conducting hot element is a metal foil strip or sheet. This increases the time of engagement of individual grass blades with the hot element to reduce the ends of the blades to ash if they are not severed.

Another embodiment of the invention is an electrically operated grass cutting device wherein the electrically activated energy path is established by a plurality of closely spaced electrodes. These electrodes define an electrical discharge path, which when contacted by the blades of grass conduct through the grass to sever the contacting grass blades. An advantage of this embodiment is in energy savings. The energy path conducts current only when needed to sever blades of grass. In this arrangement, the precautions against scorching are not required, but the safety interlock switches, as described, can be provided to prevent electrical shock should the unit be tipped.

In another embodiment, the energy path is a laser. Moving parts are eliminated in each of these embodiments, reducing maintenance expense.

The method of grass cutting according to this invention includes the steps of establishing the energy path at a location proximate to the ground for intersection by the blades of grass and moving the established energy path across an area of grass to cut a swath.

BRIEF DESCRIPTION OF THE DRAWINGS

Exemplary embodiments of an electrically operated grass cutting device apparatus in accordance with the invention are described with reference to the accompanying drawings in which.

DESCRIPTION OF THE PREFERRED EMBODIMENTS

Figure 1:
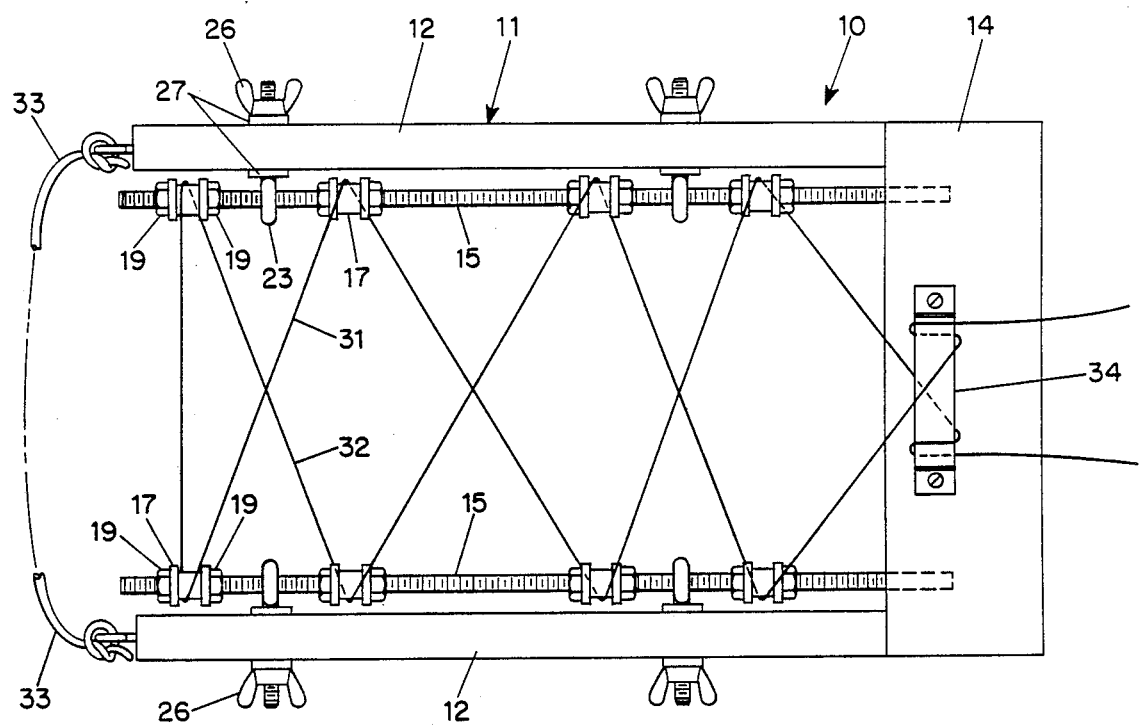
FIG. 1 is a top plan view of an actual prototype of the invention with strands of wire defining a grass severing energy path.
Figure 2:
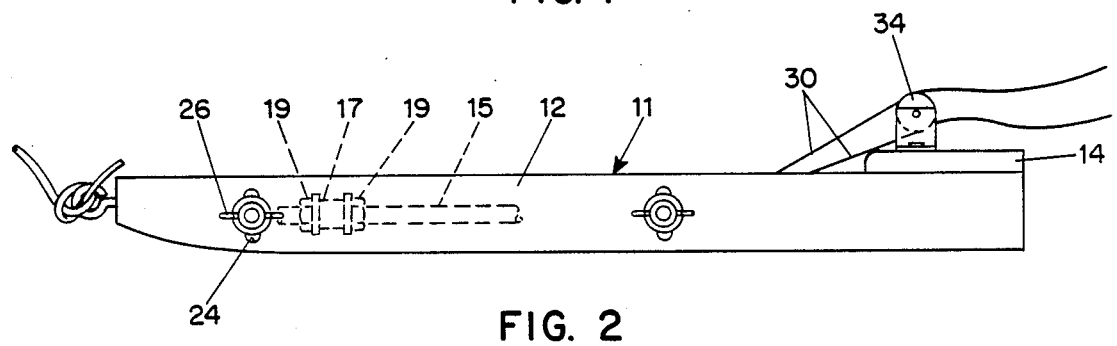
FIG. 2 is a side elevational view of the prototype of FIG. 1 showing the supporting frame of the device with slots allowing adjusting of the height of the wires.

In FIGS. 1 and 2 a prototype 10 of a grass cutting device in accordance with the invention has a frame 11, open at its front end, with a pair of parallel sides 12 and a cross member 14. Extending parallel the sides, a pair of threaded rods 15 carry insulators 17 located by pairs of nuts 19. Eyes 23 support the threaded rods 15 at four places. The eyes have threaded shafts extending through slots 24, best seen in FIG. 2. Nuts 26 tighten the eyes 23 in place. Washers 27 are used as appropriate. A strand of thin wire 30 is wound from one insulator 17 to the next. Care is taken that one of a crossing pair of runs, e.g. run 31, is higher by virtue of being wound over the insulators, and the other run, e.g. 32, is lower, as a result of coming off the bottom of the insulators 17. This prevents the strands touching and shorting. The ends of the strand 30 are brought off and secured by winding to an insulating support 3A, again with care being taken to prevent touching and shorting. In use, ordinary house current was supplied to the ends of the wire strand 30, and a pull 33 was used to draw the prototype across a narrow portion of a lawn. Silent, fume-free grass cutting was the result.

Figure 3:
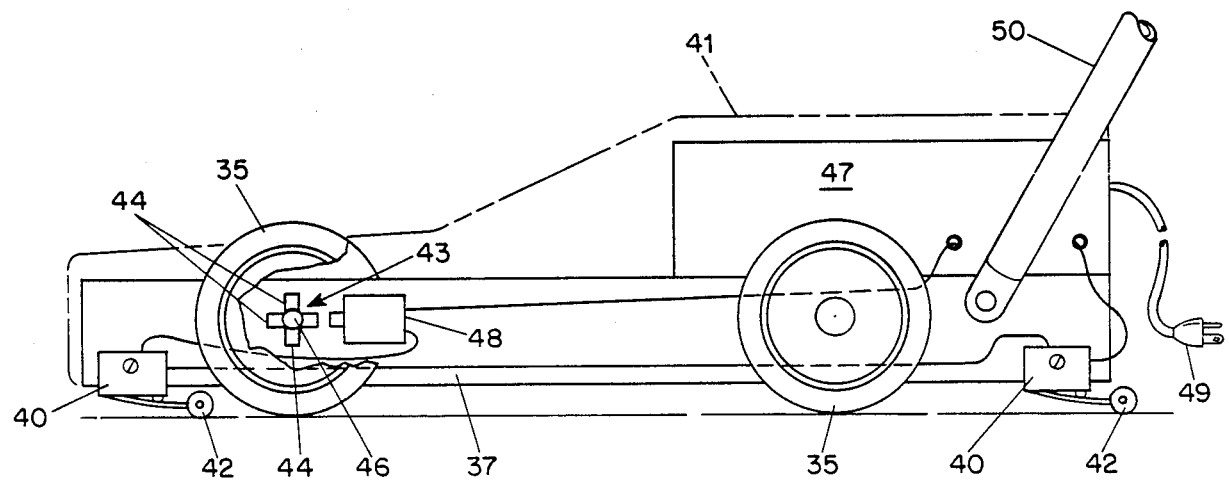
FIG. 3 is a side elevational view of the electrically operated grass cutting device equipped with wheels, a handle and a transformer housing.
Figure 4:
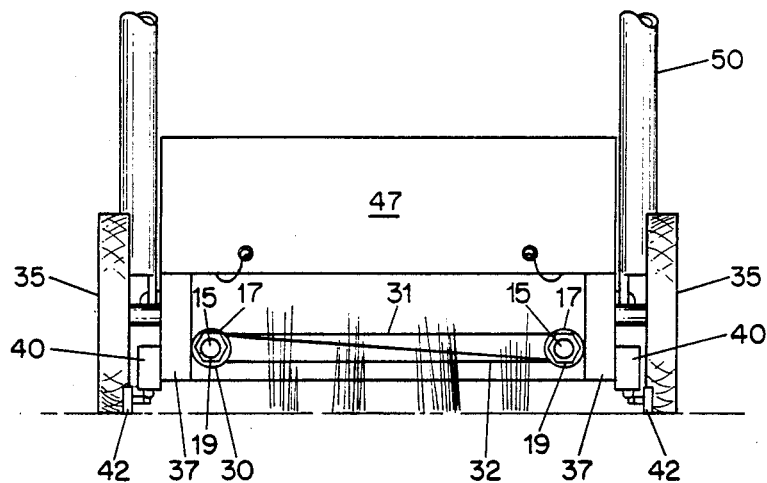
FIG. 4 is a rear, elevational view of the electrically operated grass cutting device of FIG. 3 showing the relationship of the wire strands to ground and grass blades to be cut.

FIGS. 3 and 4 illustrate a hot wire grass cutter like the prototype of FIG. 1, but in a conventional lawn mower-like configuration. Wheels 35 support a frame 37 close to the ground. Frame 37 can be similar to the rough prototype frame 11 of FIGS. 1 and 2, with an open front end and the wire strand 30 entrained back and forth between the parallel arms 12, carrying the supporting rods 15, as illustrated in FIG. 4. An outer housing can be provided and is indicated in broken lines at 41 in FIG. 3. Safety interlock switches 40 are supported at each corner of the frame. These can be known, normally open switches with an arm and roller 42 in contact with the ground and closing the switch. Ordinarily, these are in series between a current source and the cutting wire shown in FIGS. 3 and 4. Other safety interlocks are known and can be substituted or provided in addition, if desired. At 43, for example, a movement sensitive arrangement includes magnet segments 44 mounted on a wheel axel 46. Movement of these past a sensor to include a current sufficient to close a normally open switch 48 is one arrangement to assure energization of the wires only when the cutter is moved over the lawn, thus avoiding scorching by an immobile hot wire cutting device. At 47, a housing contains a transformer, if that is desired to correct voltage and current through the wire. The housing can contain as well a fuse or circuit breaker to cut off current to the grass cutter when appropriate. Ordinary house current is again contemplated as the energy source and a plug 49 for this purpose is shown in FIG. 3. Also, to minimize the likelihood of scorching, very thin wire is suggested to keep low the total heat generated proximate the lawn, while producing only the necessary heat to cut grass blades contacting the wire. A handle 50 is similar to handles on conventional power mowers and other standard features such as height adjustment can be easily incorporated. In comparison to conventional power mowers, the lightness of the hot wire device of FIGS. 1 and 2 will be immediately apparent. Only the presence of the transformer adds significant weight to the hot wire cutter, and this may be eliminated with attention to the resistance of the wire itself to avoid excess current flow.

Figure 5:
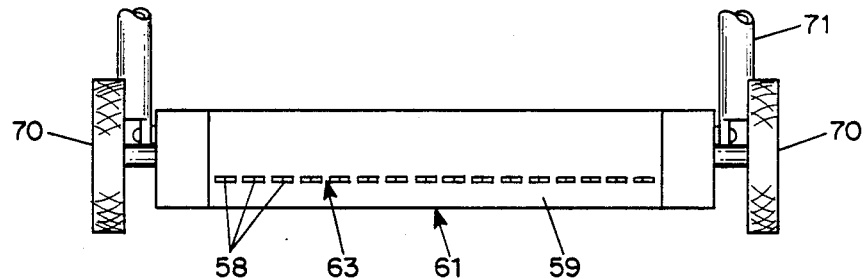
FIG. 5 is a front elevational view of an alternate embodiment of the electrically operated grass cutting device that includes a plurality of electrodes establishing a discharge path.
Figure 6:
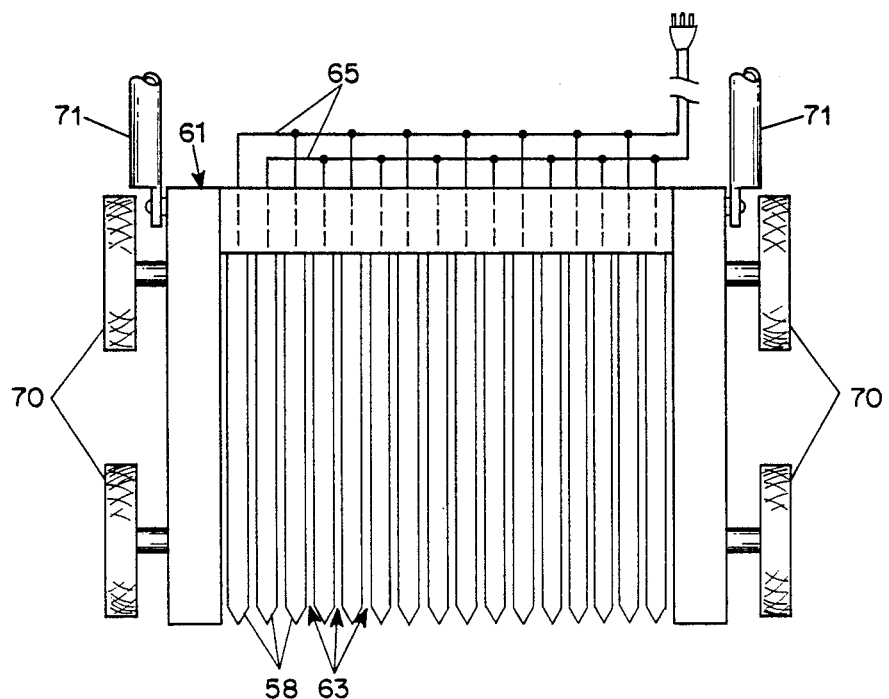
FIG. 6 is a top plan view, partly schematic, of the embodiment of FIG. 5 and shows more clearly the plurality of electrodes and their electrical connection.

In FIGS. 5 and 6 an alternate embodiment of the grass cutter has a plurality of electrodes 58. These electrodes are supported by a cross member 59 of a frame 61. They are supplied electrical potential by a pair of conductors 65 connecting adjacent electrodes to opposite polarities. Adjacent electrodes are insulated from one another. An electrical discharge path 63 is defined between the projection ends of the electrodes. Again a transformer may be necessary in this case to increase the potential between adjacent electrodes. Conventional wheels 70 and handle 71 are provided. When blades of grass engage two adjacent electrodes, sufficient current is passed through the grass to cut it at the height of the electrode.

Figure 7:
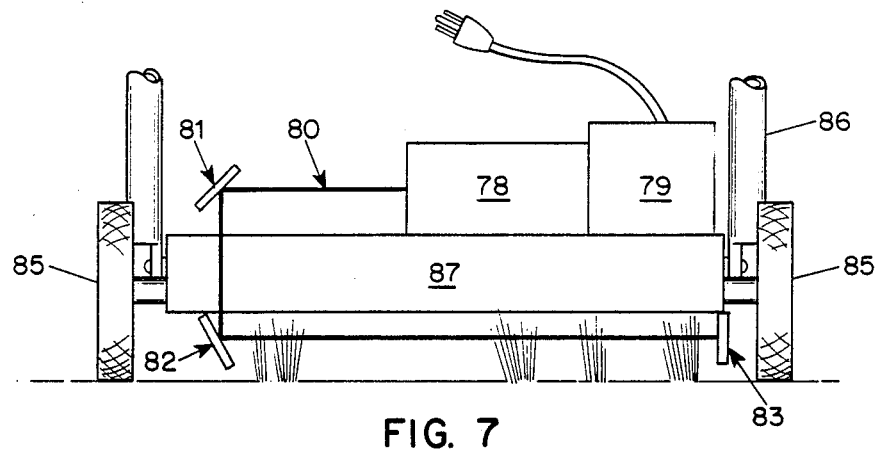
FIG. 7 is a schematic illustration of a further embodiment of an electrically operated grass cutting device and shows a laser as the energy path proximate the ground.

In another alternate embodiment in FIG. 7, a laser source 78 provides the electrically activated energy path. A high voltage supply 79 supplies the laser source. The laser beam 80 is directed, for example, by mirrors 81, 82 to a location close to and parallel the ground where it will intersect the blades of grass, which are then cut before the laser beam strikes the reflector 83 as the device is moved across the lawn. Again common components such as wheels 85, handle 86, and a housing 87 can be provided as desired.

Figure 8:
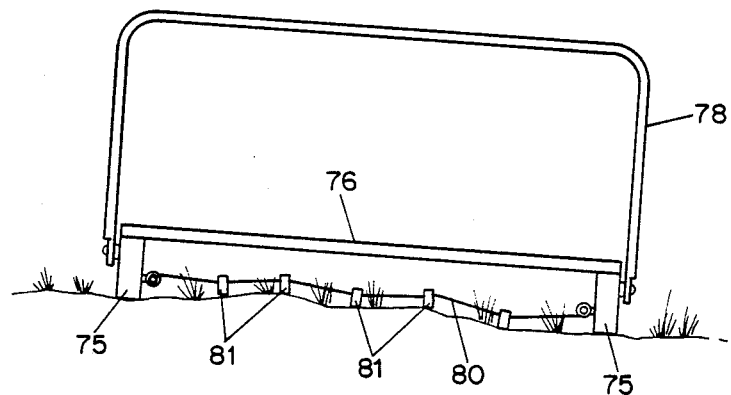
FIG. 8 is a front elevation view of a grass cutting device using the wire strand energy path to define a wide path and shows intermediate supports for the strand.

In FIG. 8 a wide hot wire cutter similar to those of FIGS. 1 through 4 has side runners 75, a cross member 76 and a handle 78 for guiding the device. Because of the lightness of these hot wire cutters, much greater width of cut can be expected, for example 5 or 6 feet wide or wider devices should be useful where space allows.

To enable hot wire strands 80 to follow the contour of the ground stradled by the cutter of FIG. 8, a series of supplemental runners 81 support the strands, causing the strands to follow the underlying lawn contours. It will be appreciated that both the edge runners and intermediate runners can be equipped with wheels or rollers if desired.

Figure 9:
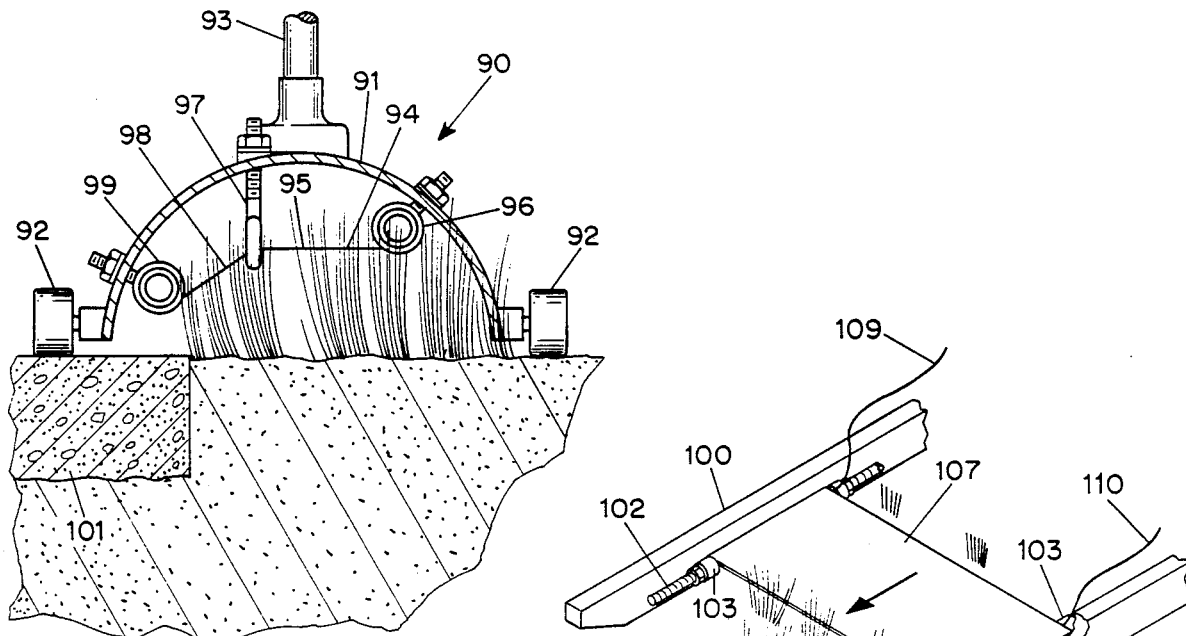
FIG. 9 is a fragmentary sectional view of a hot wire grass cutter having at lest one run of wire adapted for a beveled cut at the edge of a walk.

In FIG. 9 an edge cutter 90 is illustrative of the ability to adapt the principle of the hot wire cutting arrangement of the preceding figures to specialized applications. The cutter 90 has a housing 91, wheels 92 and a handle 93. Within the housing a strand of wire 94 has a generally horizontal run 95 from a support rod 96 to an intermediate support 97. An inclined run 98 of the wire extends from the intermediate support 97 to a further support rod 99. The inclined run 98 provides a beveled cut such as may be desired at the edge of a walk 101. Other specially contoured hot wire cutting layouts can be tailored to particular needs. For example, a lawn with a furrow or a lengthy mound can be accommodated by a specially shaped set of hot wires. Indeed, to some extent, the wires can be made adjustable, for example, in FIG. 9 by permitting adjustment of the positions of the rods 96 and 99 and the intermediate support 97. The simplicity of these tools permits their adaptation to special purposes without considerable increased expense to the user. In each of the hot wire cutters of FIGS. 8 and 9, safety interlocks can be provided, but are not shown.

Figure 10:
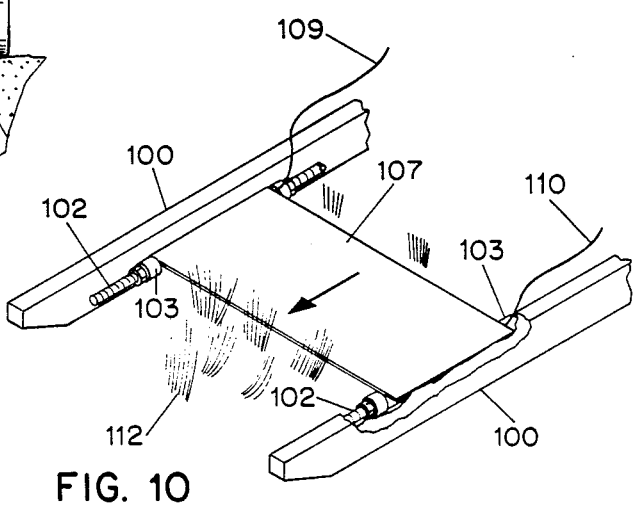
FIG. 10 is a fragmentary perspective view of an embodiment of the invention with a metal foil conductor serving as the hot, grass severing element.

In FIG. 10 a frame 100 and rails 102 with insulators 103 support a thin sheet 107 of metal foil or the like. Conductors 109 and 110 direct sufficient current to the sheet 107 to heat it to a grass searing temperature. Alternatively, currents in the sheet 107 can be produced by induction. Blades of grass 112 encountering the sheet are severed at its edge or remain in contact sufficiently long to have tips reduced to ash. This sheet can be one of several strips spanning the frame 100, and a handle, wheels and other provisions as shown in FIGS. 1–4 can be provided. Like the hot wire cutters of FIGS. 8 and 9, the foil sheet cutter can be wide and flexible and can be tailored to give a particular cut.

While specific preferred embodiments of the invention have been described, it will be recognized by those skilled in the art that variations therein may be made without departure from the invention, as described in the appended claims.

What is claimed:

1. An electrically operated grass cutting device including:
   (a) support means adapted to rest on or in close proximity to the ground,
   (b) means for directing movement of the device across an area of lawn,
   (c) means, supported by the support means, for cutting grass by establishing an electrically activated energy path proximate the ground at a location to be intersected by blades of the grass to be cut by the electrically activated energy path as the device is moved across the lawn, said means for cutting grass by establishing an electrically activated energy path being operable to sever just the upper portion of the grass at the intersection, whereby the remaining lower portion below said intersection remains substantially unharmed.

2. An electrically operated grass cutting device according to claim 1 wherein the energy path has at least a portion thereof supported to be other than generally horizontal to the ground to effect other than horizontal grass cutting.

3. An electrically operated grass cutting device according to claim 2 wherein the means for establishing an electrically activated energy path includes means for conforming the path generally to the contour of the surface of the ground.

4. An electrically operated grass cutting device according to claim 1 wherein the means for establishing an electrically activated energy path comprises at least one strand of wire extending proximate the ground at said location, and means for directing sufficient electrical current through the wire to heat the wire sufficiently to effect cutting of the intersecting blades of grass.

5. An electrically operated grass cutting device according to claim 4 wherein the means for directing sufficient electrical current, through the wire includes at least one safety interlock switch means for interrupting current to the wire when the support means is moved from proximity with the ground.

6. An electrically operated grass cutting device according to claim 4 further comprising means for conforming the strand of wire generally to the contour of the surface of the ground.

7. A method of grass cutting including the steps of:
   (a) establishing a grass cutting energy path at a location proximate the ground for intersection of blades of grass.
   (b) moving the established energy path across an area of grass to sever just the upper portions of blades of grass in a substantially uniform swath.

8. The method of grass cutting according to claim 7 wherein the step of establishing an energy path comprises:
   (a) locating at least one strand of wire at the location proximate the ground, and
   (b) directing sufficient electrical current through the wire to heat the wire to a temperature sufficient to cut blades of grass engaging the wire.

9. The method of grass cutting according to claim 7 wherein the step of establishing an energy path comprises:
   (a) locating a plurality of electrodes at the location proximate the ground sufficiently closely spaced to be bridged by the blades of grass intersecting the energy path, and
   (b) establishing an electrical potential across the electrodes for grass-severing discharge through the intersecting blades of grass.

10. The method of grass cutting according to claim 7 wherein the step of establishing an energy path comprises:
    providing a laser having a laser beam path at the location proximate the ground.

11. The method of grass cutting according to claim 7 wherein the step of establishing an energy path comprises:
    providing a conductive sheet at the location proximate the ground and causing an electrical current to flow in the sheet.

12. An electrically operated grass cutting device including:
    (a) support means adapted to rest on or in close proximity to the ground,
    (b) means for directing movement of the device across an area of lawn,
    (c) means, supported by the support means, for cutting grass by establishing an electrically activated energy path proximate the ground at a location to be intersected by blades of the grass to be cut by the electrically activated energy path as the device is moved across the lawn, the means for establishing an electrically activated energy path comprising at least one strand of wire extending proximate the ground at said location, and means for directing sufficient electrical current through the wire to heat the wire sufficiently to effect cutting of the intersecting blades of grass,
    (d) means for conforming the strand of wire generally to the contour of the surface of the ground, the means for conforming the strand of wire generally to the ground comprising ground contacting support means spaced along the strand of wire, for contacting the ground beneath the wire and supporting the wire at a predetermined distance from the ground.

13. An electrically operated grass cutting device according to claim 12 wherein the wire strand extends laterally across the direction of movement of the cutting device a distance sufficient to cut a swath in excess of three feet wide.

14. An electrically operated grass cutting device including:
   (a) support means adapted to rest on or in close proximity to the ground, the support means comprising a frame having sides extending generally in the direction of movement of the device, and the strand of wire extending between the sides across the path of movement of the frame,
   (b) means for directing movement of the device across an area of lawn,
   (c) means, supported by the support means, for cutting grass by establishing an electrically activated energy path proximate the ground at a location to be intersected by blades of the grass to be cut by the electrically activated energy path as the device is moved across the lawn, the means for establishing an electrically activated energy path comprising at least one strand of wire extending proximate the ground at said location, and means for directing sufficient electrical current through the wire to heat the wire sufficiently to effect cutting of the intersecting blades of grass.

15. An electrically operated grass cutting device according to claim 14 wherein the strand of wire is suspended above the location of the ground in several runs between the sides of the frame, the runs traversing the path of movement of the frame.

16. An electrically operated grass cutting device including:
   (a) support means adapted to rest on or in close proximity to the ground,
   (b) means for directing movement of the device across an area of lawn,
   (c) means, supported by the support means, for cutting grass by establishing an electrically activated energy path proximate the ground at a location to be intersected by blades of the grass to be cut by the electrically activated energy path as the device is moved across the lawn, the means for establishing an electrically activated energy path comprising a plurality of electrodes defining an electrical discharge path between the electrodes when contacted by the blades of grass intersecting the path.

17. An electrically operated grass cutting device including:
   (a) support means adapted to rest on or in close proximity to the ground,
   (b) means for directing movement of the device across an area of lawn,
   (c) means, supported by the support means, for cutting grass by establishing an electrically activated energy path proximate the ground at a location to be intersected by blades of the grass to be cut by the electrically activated energy path as the device is moved across the lawn, the means for establishing an electrically activated energy path being a laser having a laser beam path at said location.

18. An electrically operated grass cutting device including:
   (a) support means adapted to rest on or in close proximity to the ground,
   (b) means for directing movement of the device across an area of lawn,
   (c) means, supported by the support means, for cutting grass by establishing an electrically activated energy path proximate the ground at a location to be intersected by blades of the grass to be cut by the electrically activated energy path as the device is moved across the lawn, the means for establishing an electrically activated energy path comprising at least one section of conductive sheet material and electrical current providing means for effecting a current flow in the sheet sufficient to heat the sheet to a grass-searing temperature.

* * * * *